Patented Apr. 21, 1936

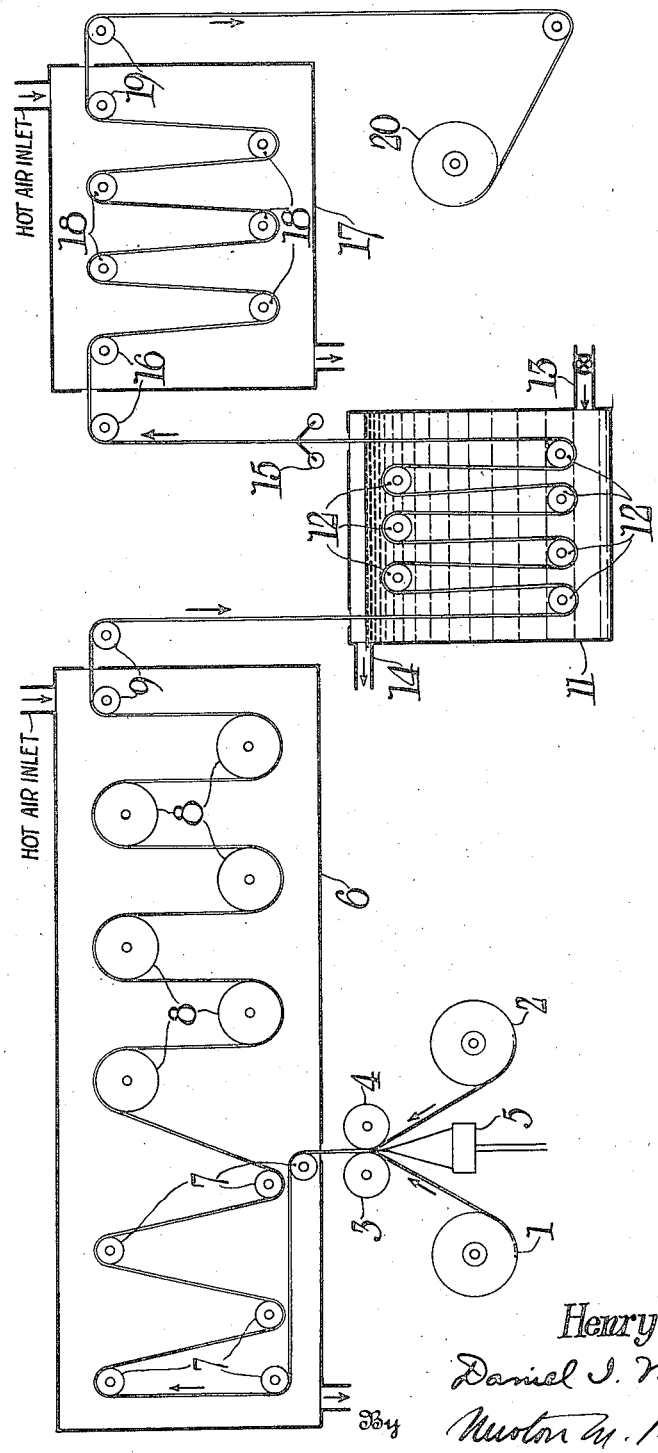

2,037,744

UNITED STATES PATENT OFFICE 2,037,744

CURING LAMINATED SHEETING

Henry E. Van Derhoef, Rochester, N. Y., assignor to Eastman Kodak Company, Rochester, N. Y., a corporation of New York Application May 5, 1933, Serial No. 669,530

10 Claims. (Cl. 18—51)

This invention relates to the lamination and curing of cellulose derivative sheeting and more particularly to the lamination of cellulose derivative sheeting by the use of a solvent and the curing of that sheeting by passing it through water for the removal of that solvent—the latter being an operation which I term "water-boxing".

In my Patent No. 1,540,822, I have described a method and apparatus for laminating cellulose derivative sheeting so as to form a sheet which to all intents and purposes is a single, homogeneous sheet having a thickness approximately equal to that of the combined thicknesses of the sheets used for producing the laminated stock. Where thick sheeting is desired, it is more economical to produce it by first casting thin sheeting at a high speed and then laminating that thin sheeting into thicker stock than it is to cast thick sheeting at a much slower speed. The solvent or cement for effecting adherence of the sheets together is applied to the sheet in a manner, such for instance, as that described in my Patent No. 1,641,403.

While I have successfully employed the above patented method of producing laminated sheeting, the process has been found to have the drawback of requiring long curing of the laminated stock, so that the process was found to be one relatively expensive to operate. This is true whether the thin sheeting still contains considerable solvent or is substantially completely air-cured. Furthermore, it became apparent that the complete removal of the solvent from the laminated stock was difficult, the reason for this being that the solvent cement is occluded between two substantially cured and relatively hard sheets, so that the solvent cannot completely permeate or travel to the surface of the laminated sheeting and thereby be removed from the stock by mere evaporation. Hence, when the laminated sheeting was coated with a photographic emulsion to produce photographic film, and this film was exposed and subjected to the usual processing, a considerable shrinkage took place in the film by virtue of further removal of residual solvent from the laminated base by the processing solutions. While this is not a particular fault with some kinds of film, it is with others. For instance, photographic film used for mapping purposes must give a substantially true reproduction to scale of the image and, for that purpose for instance, it becomes highly desirable to have a film which is substantially non-shrinking upon the processing thereof in the usual photographic baths.

I have now discovered that the solvent may be substantially completely removed from the laminated stock in a relatively short time by passing it through a water bath, or as it is sometimes termed, through a "water-box"—such water treatment being termed "water-boxing".

It is an object of my invention, therefore, to produce laminated cellulose derivative sheeting and more particularly to produce a substantially non-shrinking laminated stock. A further object of my invention is to provide a process for laminating cellulose derivative sheeting and for curing the laminated stock by passing it through a water bath. Another object of my invention is to provide a process for substantially completely removing the solvent from laminated stock. Other objects will be apparent upon further perusal of this specification.

In its broader aspects, my invention consists in laminating two or more strips of relatively thin, cellulose derivative sheeting to form a relatively thick, laminated sheet, which laminated stock is then treated with a water bath at a suitable temperature.

The separate sheetings which are used to build up the laminated stock, may be whatever type of cellulose derivative desired, such for instance as cellulose nitrate, cellulose acetate, cellulose acetate propionate, or the like. These thin sheets may range from .001 to .006 of an inch in thickness approximately, and there may be laminated two or more sheets, as shown in my Patent No. 1,540,822. These sheets may be led to the laminating device direct from the coating wheel upon which they are produced, such as described in my aforementioned patent, or they may be supplied to the laminating device from stock rolls of sheeting, which have been previously produced and stored until ready for laminating. Such sheeting may be any desired width, such as forty to fifty inches wide as normally produced on a casting wheel. Any length convenient may be employed.

In the attached diagrammatic elevational drawing, I have illustrated a form of device which may be used to carry out my invention. In this, the supply rolls 1 and 2 generically represent thin sheeting in the form of rolls of thin stock or in the form of sheeting coming from the casting wheel after suitable intervening curing. These thin sheets then pass upwardly between the pressure rolls 3 and 4, a supply of solvent cement being provided by the hopper 5, such as described in my Patent No. 1,641,403. A suitable solvent cement for substantially all types of cellulose derivative is acetone. This acetone is forced upwardly so as to contact with the thin sheets just prior to the passage of the thin sheeting through the pressure rolls 3 and 4. The acetone acts quite rapidly upon the inner surface of the thin sheeting, reducing those surfaces to a plastic state so that, as the thin sheets pass between the pressure rolls 3 and 4, the surfaces of the thin sheeting unite forming a homogeneous, thick sheeting.

It will be noted, however, that at this stage the sheeting has trapped, in the center lamina thereof, the solvent cement which has been deposited by hopper 5. The laminated stock is then led upward through a casing 6 over rolls 7 and then over heated curing drums 8, these rolls 7 and drums 8 being enclosed in the casing 6 through which there is circulated warm or hot air to remove from the sheet whatever solvent is available for such removal.

From the last drum 8 the laminated stock is led from the casing 6 over rolls 9 into the waterbox 11. In this water-box, the laminated stock is conducted up and down over a series of idler and/or driven rolls 12. The water-box 11 is supplied with circulating, relatively pure, water introduced at a temperature of, for instance, 150° F. through the pipe 13 which is controlled by a suitable valve for regulating the inflow of water. The tank is provided with a suitable overflow 14. From the water-box 11, the laminated stock is led through the squeegee device 15 over rolls 16 into the casing 17 in which it is conducted over rolls 18. In this casing 17, the water is removed from the laminated stock by evaporation, warm air being circulated through the casing 17 as indicated. From the casing 17, the completely dried laminated stock is led over rolls 19 onto the wind-up 20, upon which it is wound in suitable lengths, cut off, and taken to storage.

Numerous other solvent cements may be employed in cementing together the thin sheetings, such for instance as a mixture of acetone and methyl alcohol, ethylene chloride and ethyl alcohol and various other solvents for the particular cellulose sheeting which is being laminated, the solvents necessary for such purpose being well known to those skilled in the cellulose derivative art. These solvents may also have added thereto a small proportion of the cellulose derivative being cemented, if desired. These are all referred to hereinafter as a solvent cement.

The number of rolls 7 or curing drums 8 in the chamber 6 may be any desired, it being the purpose of this air-curing treatment to remove as much solvent as can be completely and practically done by air without unduly slowing up the process. The drums 8 may be heated to a temperature anywhere from 150 to 250° F. depending upon the speed with which the film is traveling, it being undesirable, of course, to employ a temperature so high as will cause any decomposition of the film. The air that is circulated through this casing 6 may be introduced, say at a temperature of 150° F., although higher or lower temperatures may be employed.

The speed with which the water is circulated through the water-box 11 depends, of course, upon the amount of solvent to be removed from the sheeting, the temperature at which the water is introduced and the length of time the sheeting remains in the water-box. It is best to lean upon the side of having an excess supply of water circulating through the water-box, the exact amount being determined by testing samples of laminated stock which have been subjected to this treatment to ascertain whether the solvent has been sufficiently removed for the purpose desired. As above stated, the water may be introduced at 150° F. or higher, although too high a water temperature has, with certain solvents such as acetone in the sheeting, been found to give blushing in the sheeting.

The number of rolls provided in the casing 17 is optional, the sheeting being maintained in the casing 17 merely for sufficient length of time to completely remove all water and moisture from the sheeting.

Laminated stock produced as above described will be found to possess only a fraction of a percent, such as .1 or .2 of a percent, of shrinkage even after being tested by soaking in water for 24 hours and then drying. Photographic film produced by coating photographic emulsions upon such laminated stock is eminently suited as a non-shrinking film for purposes of making maps, and the like, by aerial photography. Numerous variations in the apparatus and process above described will occur, of course, to those skilled in the art, such as variations in size of curing casings, the number of rolls they will employ, the temperature of curing and the like. However, all of these variations come under the teachings of my invention and, it will be understood, are to be included in the claims appended hereto.

What I claim as my invention and desire to be secured by Letters Patent of the United States is:

1. The process which comprises laminating, by the use of a solvent cement, a plurality of cellulose derivative sheets and treating such laminated stock with water to remove residual solvent therefrom.

2. The process which comprises laminating, by the use of a solvent cement, a plurality of cellulose derivative sheets and treating such laminated stock with water at an elevated temperature to remove residual solvent therefrom.

3. The process which comprises laminating by the use of a solvent cement a plurality of cellulose derivative sheets and treating such laminated stock with water at a temperature ranging from approximately 150° F. to 200° F.

4. The process which comprises laminating, by the use of a solvent cement, a plurality of cellulose derivative sheets and treating such laminated stock with water at a temperature ranging from approximately 150° F. to 200° F.

5. The process which comprises laminating by the use of a solvent cement a plurality of cellulose derivative sheets, treating such laminated stock with water to remove residual solvent therefrom and drying the laminated stock to remove the water therefrom.

6. The process which comprises laminating, by the use of solvent cement, a plurality of cellulose acetate sheets and treating such laminated stock with water at an elevated temperature to remove residual solvent therefrom.

7. The process which comprises laminating, by the use of solvent cement, a plurality of cellulose nitrate sheets and treating such laminated stock with water at an elevated temperature to remove residual solvent therefrom.

8. The process which comprises laminating, by the use of an acetone cement, a plurality of cellulose derivative sheets and treating such laminated stock with water at an elevated temperature to remove residual solvent therefrom.

9. The process which comprises laminating, by the use of an acetone cement, a plurality of cellulose acetate sheets and treating such laminated stock with water at an elevated temperature to remove residual solvent therefrom.

10. The process which comprises laminating, by the use of an acetone cement, a plurality of cellulose nitrate sheets and treating such laminated stock with water at an elevated temperature to remove residual solvent therefrom.

HENRY E. VAN DERHOEF.